April 29, 1969     W. LYMAR     3,441,103
AUTOMOBILE SAFETY DEVICE

Filed July 17, 1967     Sheet 1 of 2

INVENTOR.
WASYL LYMAR
BY
Lothrop & West
ATTORNEYS

April 29, 1969 W. LYMAR 3,441,103
AUTOMOBILE SAFETY DEVICE
Filed July 17, 1967 Sheet 2 of 2
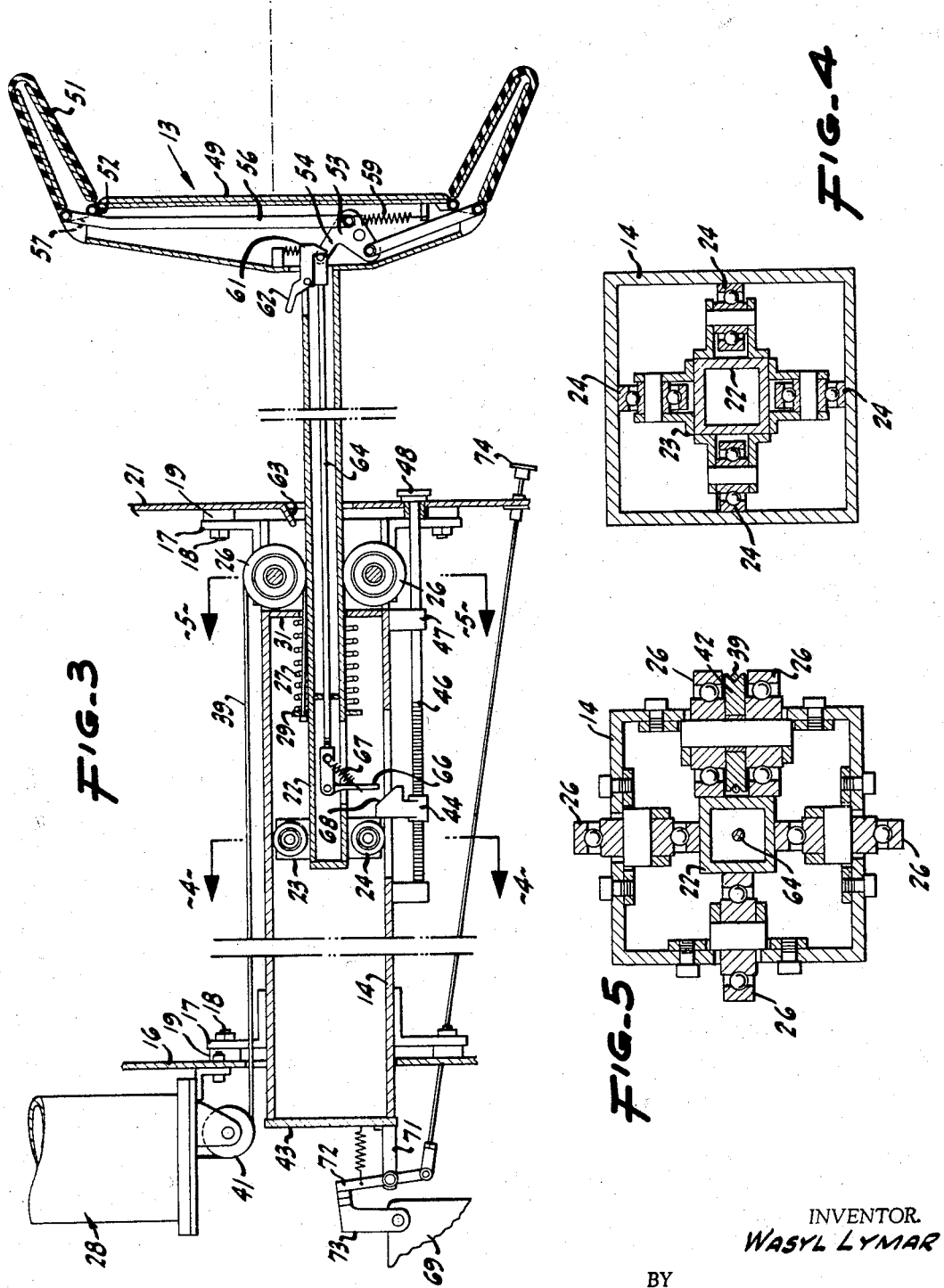
INVENTOR.
WASYL LYMAR
BY
Lothrop & West
ATTORNEYS

United States Patent Office 3,441,103
Patented Apr. 29, 1969

3,441,103
AUTOMOBILE SAFETY DEVICE
Wasyl Lymar, Broderick, Calif., assignor of one-half to Lowell B. Haney, Sacramento, Calif.
Filed July 17, 1967, Ser. No. 653,936
Int. Cl. B60r *19/00*
U.S. Cl. 180—82          8 Claims

ABSTRACT OF THE DISCLOSURE

An elongated bar extending transversely of an automobile is moved from a position forward of the seat of the automobile into engagement with a person thereon in response to the vacuum system of the automobile when the engine is started. Wings on the ends of the bar are swung and locked into a position near the person's sides to prevent motion of the person transversely of the automobile.

---

The invention relates to automobile safety devices and in particular to devices for holding a person on the seat of the automobile in the event of an accident or a panic stop.

In the event of an accident, a rider in an automobile, and particularly the driver, is much less likely to be killed or severely injured if he is held on his seat and not allowed to move freely therein and perhaps be thrown against the dashboard or the pavement outside. A frequently used method for holding a person on his seat is the seat belt, but since the belt must be released to permit entry and exit by the rider, it is often rendered useless by the neglect of the rider to fasten it.

Another form of device for holding a person on his seat is a bar supported somewhere in front of him which may be positioned and held against him. The bar must move away from the person to facilitate his entry and exit, so like the seat belt the bar is only useful when it has been activated by the rider. Furthermore, if such a bar were straight, motion of the person transversely of the automobile would be allowed and the person could possibly slide out from behind the bar.

It is therefore an object of the invention to provide a device for holding a person on his seat in an automobile which is automatically activated when the automobile is started.

Another object of the invention is to provide a safety device for automobiles of the bar type with wings to prevent motion of a person transversely of the automobile and out from behind the bar.

Another object of the invention is to provide a safety device for automobiles of the bar type which is straight when stored for economy of space and which may be made straight when in operative position so a person can escape from behind it.

Another object of the invention is to provide an automobile safety device with a source of vibration to relax the rider and reduce driving fatigue.

Still another object of the invention is to provide a generally improved automobile safety device.

Other objects together with the foregoing are attained in the embodiment of the invention described in the accompanying description and illustrated in the accompanying drawings, in which:

FIGURE 3 is a cross sectional view similar to FIGURE 2 in which the safety device is shown in its extended position;

FIGURE 4 is a cross sectional view taken along the line 4—4 in FIGURE 3; and

FIGURE 5 is a cross sectional view taken along the line 5—5 in FIGURE 3.

Figure 1:
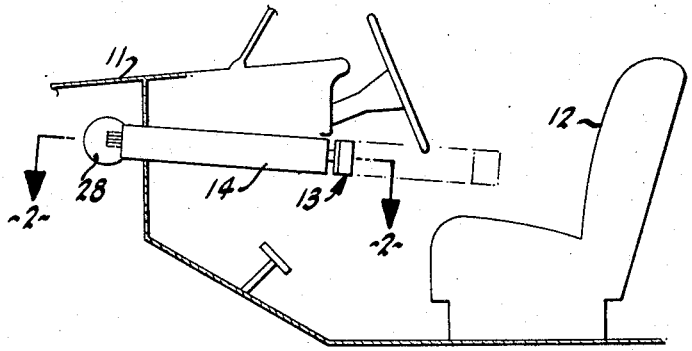
FIGURE 1 is a diagrammatic view of a portion of an automobile having a safety device embodying the invention installed therein.

Referring first to FIGURE 1, an automobile 11 having a seat 12 has mounted therein a safety device generally designated 13.

Figure 2:
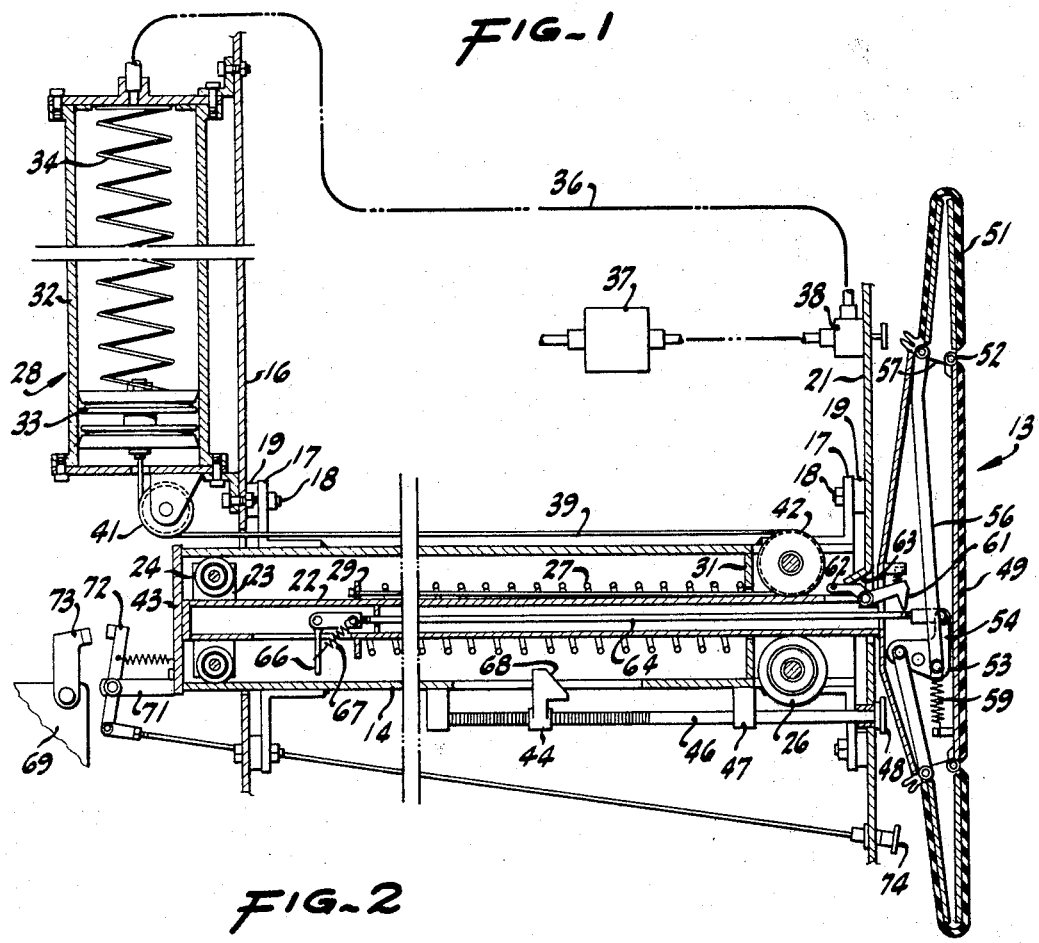
FIGURE 2 is a cross sectional view of the safety device of the present invention, taken on a plane as generally indicated by the line 2—2 of FIGURE 1, showing the safety device in retracted position.

Referring now to FIGURES 2 and 3, the means for mounting the safety device 13 in the automobile includes a hollow cylindrical tube 14 square in cross section and extending longitudinally thereof. Adjacent its forward end the tube 14 is mounted on the firewall 16 of the automobile by brackets 17 extending outwardly therefrom. Bolts 18 connects the brackets 17 to the firewall, and rubber bushings 19 are interposed therebetween to provide for a flexible connection. The rearward end of the tube 14 is attached to the dashboard 21 of the automobile by similar brackets, bolts and rubber bushings.

Mounted within the tube 14 for longitudinal motion with respect thereto is a second cylindrical tube 22, also square in cross section, but of smaller dimensions than the outer tube 14. At the forward end of the inner tube 22 a bearing mount 23 extends outwardly therefrom. As shown in FIGURE 4, the bearing mount supports bearings 24 on each of the four sides of the square inner tube 22. Each of the bearings 24 rides against one of the inner surfaces of the square outer tube 14 so as to position the inner tube 22 therein and so as to provide for smooth motion therebetween. At the rearward end of the outer tube 14 bearings 26 are similarly mounted on the sides thereof extending inwardly to engage the sides of the square inner tube 22 as shown in FIGURE 5.

Means is provided for moving the inner tube 22 with respect to the outer tube 14 by a spring 27 and a vacuum cylinder 28. The spring 27, which is coiled about the inner tube 22, engages the inner tube through a plate 29 extending outwardly therefrom at a position spaced somewhat rearwardly of the bearing mount 23. Engagement of the spring 27 with the outer tube 14 is provided for by a plate 31 extending inwardly from the outer tube forward of the bearings 26.

The vacuum cylinder 28 provides for the rearward motion of the inner tube 22. It is of conventional design, having a casing 32, a piston 33 and a spring 34, and it may be conveniently mounted on the firewall 16 adjacent the outer tube 14. Vacuum is supplied to the cylinder from the intake manifold or the vacuum pump of the automobile through a line 36 containing a release valve 37 and passing through a valve 38 mounted on the dashboard. A vacuum in the line 36 causes the piston 33 to move against the spring 34 into the evacuated portion of the casing 32. This motion of the piston is transmitted to a cable 39, one end of which is connected thereto. A pulley 41 directs the cable 39 to the rearward portion of the outer tube 14, where the cable passes over a pulley 42 mounted on the outer tube with the bearings 26 (as shown in FIGURE 5) and then along the inner tube, within the outer tube, to a connection of its other end with the plate 29 on the inner tube.

Forward travel of the inner tube 22 within the outer tube 14 is limited by a plate 43 extending across the forward end of the outer tube. Rearward travel of the inner tube is limited by a stop 44 which extends into the outer tube to engage the bearing mount 23 on the forward end of the inner tube. To compensate for persons of different sizes and the adjustment in the position of the seat, the position of the stop 44 is adjustable by means of a rod 46. The rod 46 is journalled for rotation in a pair of brackets 47 mounted on the outside of the outer tube 14, and its extends rearwardly through the dashboard 21 to a knob 48. The portion of the rod 46 between the brackets 47 is threaded and the stop 44 extends through a slot in the outer tube to ride on these threads. Rotation of the knob 48 thus rotates the rod 46, which moves the stop 44 forwardly and rearwardly to determine the extent of rearward motion of the inner tube.

On the rearward end of the inner tube 22 an elongated bar 49 is mounted extending generally transversely of the automobile. The bar 49 has suitable padding over its rearward surface so as to provide no discomfort when in engagement with the torso of a person. To prevent transverse motion of a person when the bar 49 has been moved into engagement with him, each end of the bar is provided with a wing 51 extending therefrom. Each wing is mounted on the bar by a pivot pin 52 adjacent the rearward surface of the bar so that the wing may swing toward the rear of the automobile to a position adjacent the side of the person with whom the bar has been moved into engagement. Each wing may be padded in a similar manner to the bar.

The bar 49 has a hollow portion, and mounted therein is means for swinging the wings 51 into the position adjacent the side of a person and for locking them there. Within this hollow portion adjacent the junction of the bar 49 with the inner tube 22 a lever 53 is mounted at its center for rotation about an axis perpendicular to both the bar 49 and the inner tube 22. An arm 54 extends perpendicularly from the lever 53 at a point adjacent one end thereof. At the point of junction of the lever 53 and the arm 54, a rod 56 connected thereto runs to a connection on an ear 57 on one of the wings 51 extending forwardly of the pivot pin 52. Similarly, another rod runs from an ear on the other wing to a connection on the lever at the other end thereof. The connections of the two rods 56 with the lever and with the ears on the wings permit relative rotation therebetween about axes parallel to that of the rotation of the lever. The two rods 56 are so positioned and are of such a length that when the lever 53 is turned so that the arm 54 extends substantially transversely of the automobile from the rearward end of the lever (as shown in FIGURE 2), one of the rods extends generally along the arm and the two wings extend transversely of the automobile. The lengths of the lever and of the ears on the wings are chosen so that when the lever is rotated so that the arm extends generally forwardly of the automobile (as shown in FIGURE 3), the wings are swung into their position adjacent the sides of the person on the seat. A spring 59 is attached at one of its ends to the bar 49 and at its other end to the point of junction between the lever 53 and the arm 54 such that the wings are biased in the position extending transversely of the automobile. The wings may be locked in their rearwardly extending position by a spring-biased clip 61 mounted on the outside of the inner tube which extends into the bar 49 to engage the arm 54 on the lever 53 when the arm is in its forwardly extending position (FIGURE 3). The clip 61 has a forwardly extending handle 62 which may be readily engaged by the person with whose torso the bar is engaged so as to release the wings manually. The forwardly extending handle 62 also engages a trip 63 on the dashboard 21 when the inner tube 22 is in its forward position to release the wings 51 automatically when the device is not in use.

Automatic operation of the wings 51 when the bar 49 is moved into its operative position is provided for by a rod 64 extending from a connection at the end of the arm 54 on the lever 53 forwardly through the interior of the inner tube 22 to a position between the bearing mount 23 and the plate 29. At the forward end of the rod 64 a lever 66 extends outwardly through a slot in the inner tube a sufficient distance to engage the stop 44. The connection between the rod 64 and the lever 66 permits relative rotation therebetween about an axis perpendicular to both, and a spring 67 biases the lever in a position substantially perpendicular to the rod 64. This spring 67 is stronger than the spring 59 so that as the inner tube 22 moves rearwardly the lever 66 will engage the stop 44 and cause the wings 51 to move and lock into their rearwardly extending position before the lever 66 is allowed to slip over the stop 44. A ramp 68 extending from the rearward edge of the stop 44 permits the lever 66 to slip over the stop easily as the inner tube is moving forwardly. Thus at a specified distance before the end of the rearward travel of the inner tube 22 as determined by the adjustable stop 44, the wings 51 will be moved and locked into position, but the mechanism providing this function will not hinder the rearward motion of the inner tube nor the ability to manually release the wings by releasing the clip 61 with the handle 62.

As an additional feature of this device, means may be provided for attaching the outer tube 14 directly to the engine 69 of the automobile to transmit the engine vibrations to the person using the device so as to relax the person and reduce driving fatigue. A bracket 71 attached to the outer tube may serve as the fulcrum for a lever 72 which may be moved into engagement with a bracket 73 attached to the engine. A suitable control 74 on the dashboard may be used to move this lever from its inoperative position (FIGURE 2) to its operative position (FIGURE 3).

The operation of the safety device is now readily apparent. Upon the starting of the engine of the automobile, the line 36 is evacuated and the vacuum cylinder 28 automatically moves the bar 49 into engagement with the person sitting on the seat and holds the bar in this position. The appropriate position of the bar for a particular passenger and a particular seat position may be adjusted by rotating the knob 48 on the dashboard which determines the position of the stop 44. A fixed interval before the bar 49 reaches its operative position, as determined by the interaction of the bearing mount 23 with the stop 44, the lever 66 reaches the stop. Since the spring 67 is stronger than the spring 59, rearward motion of the rod 64 is impeded and the arm 54 turns the lever 53 against the spring 59 until the arm is locked in place by the clip 61. As the lever 53 turns, the rods 56 move generally transversely of the automobile and thereby swing the wings 51 into the rearwardly extending position. When the arm 54 is locked by the clip 61, the spring 67 will allow the lever 66 to slide over the stop 44 during the remaining rearward motion of the bar until the bearing mount 23 reaches the stop 44, as shown in FIGURE 3. The length of the interval between the interaction of the lever 66 and the bearing mount 23 with the stop 44 may be conveniently fixed by the length of the rod 64.

If the person wishes to slide out from under the bar 49, the wings 51 may be returned to the transversely extending position manually by simply reaching behind the bar and releasing the clip 61 with the handle 62. The lever 53 will then turn, retracting the rods 56 and swinging the wings 51 into the transversely extending position, under the urgency of the spring 59. The bar 49 may be returned to its forward position either by breaking the vacuum by operation of the valve 38 on the dashboard or by stopping the engine. The vacuum cylinder 28 will then cease to operate and the spring 27 will urge the inner tube 22 forward. As the inner tube moves forward, the lever 66 will easily move up the ramp 68 and over the stop 44, and the trip 63 will release the clip 61 when the bar 49 reaches the vicinity of the dashboard, so that the wings may return to the transversely extending position.

What is claimed is:

1. A safety device for holding a person on the seat of an automobile which comprises:
   (a) an elongated bar extending transversely of said automobile and adapted to engage the torso of said person;

(b) means on said automobile forward of said seat for supporting said bar for motion toward and away from said torso of said person when said person is positioned on said seat;
(c) means for moving said bar toward said torso of said person upon the starting of the engine of said automobile; and,
(d) means for connecting said supporting means to said engine for vibration of said supporting means and said bar therewith.

2. A safety device for holding a person on the seat of an automobile, said device comprising:
(a) an elongated bar extending transversely of said automobile and adapted to engage the torso of said person;
(b) means on said automobile forward of said seat for supporting said bar for motion toward and away from said torso of said person when said person is positioned on said seat;
(c) means operatively connected to the vacuum system of said automobile for moving said bar toward said torso of said person upon the starting of the engine of said automobile;
(d) a wing pivotally mounted on one end of said bar; and,
(e) means on said bar for automatically swinging said wing from a first position in substantial alignment with said bar to a second position in angular relation thereto, with said wing adjacent the side of said torso of said person, as said bar is moved toward said torso of said person.

3. A safety device as in claim 2 including means for releasably locking said wing in said second position.

4. A safety device as in claim 2 wherein said bar supporting means includes an outer tube; an inner tube translatably disposed within said outer tube and connected to said bar; means on said tubes for selectively limiting the extent of relative longitudinal movement therebetween; and means for biasing said inner tube and said bar in a direction away from said person on said seat.

5. A safety device as in claim 4 wherein said vacuum-operated, bar-moving means includes a cylinder connected to said vacuum system of said automobile; a pistion reciprocable within said cylinder in response to the vacuum within said cylinder; and means operatively connecting said piston and said inner tube and being effective to overcome said biasing means, thereby urging said bar in a direction toward said person on said seat.

6. A safety device as in claim 4 wherein said automatic wing swinging means includes a first lever pivotally mounted on said bar and connected to said wing; a second lever pivotally mounted on said inner tube and connected to said first lever; and means carried by said outer tube for spring biased interference with said second lever at a predetermined longitudinal position of said inner tube relative to said outer tube for actuating said first lever and said wing.

7. A safety device as in claim 6 including a spring-biased clip pivotally mounted on said bar for latchably engaging said first lever when said wing is swung toward said second position.

8. A safety device as in claim 7 further characterized by means for rendering said clip inoperative.

References Cited
UNITED STATES PATENTS

| | | | |
|---|---|---|---|
| 2,801,866 | 8/1957 | Naslund | 180—82 X |
| 2,902,292 | 9/1959 | Land | 280—150 |
| 2,977,135 | 3/1961 | Graham | 280—150 |
| 3,105,702 | 10/1963 | Larson | 280—150 |

A. HARRY LEVY, *Primary Examiner.*

U.S. Cl. X.R.

280—150